United States Patent
Chakraborty et al.

(10) Patent No.: US 11,134,409 B2
(45) Date of Patent: *Sep. 28, 2021

(54) DETERMINING WHETHER A FLOW IS TO BE ADDED TO A NETWORK

(71) Applicant: HEWLETT PACKARD ENTERPRISE DEVELOPMENT LP, Houston, TX (US)

(72) Inventors: Ayon Chakraborty, Palo Alto, CA (US); Shruti Sanadhya, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/358,639

(22) Filed: Mar. 19, 2019

(65) Prior Publication Data

US 2019/0215716 A1 Jul. 11, 2019

Related U.S. Application Data

(63) Continuation of application No. 15/179,872, filed on Jun. 10, 2016, now Pat. No. 10,271,240.

(51) Int. Cl.
*H04W 28/02* (2009.01)
*G06F 9/30* (2018.01)
(Continued)

(52) U.S. Cl.
CPC .... *H04W 28/0268* (2013.01); *G06F 9/30043* (2013.01); *G06F 9/30145* (2013.01);
(Continued)

(58) Field of Classification Search
CPC . H04W 28/0268; H04W 84/12; H04W 88/16; H04J 11/00; H04L 1/0018;
(Continued)

(56) References Cited

U.S. PATENT DOCUMENTS

| | | |
|---|---|---|
| 4,710,866 A | 12/1987 | Zolnowsky et al. |
| 5,321,606 A | 6/1994 | Kuruma et al. |

(Continued)

FOREIGN PATENT DOCUMENTS

WO 20111056087 A1 5/2011

OTHER PUBLICATIONS

Aggarwal et al, "Prometheus: Toward Quality-of-Experience Estimation for Mobile Apps from Passive Network Measurements" (Year: 2014).*

(Continued)

*Primary Examiner* — Farley Abad
(74) *Attorney, Agent, or Firm* — Hewlett Packard Enterprise Patent Department

(57) ABSTRACT

An example method of operating a network may include determining whether a flow is to be added to the network based on: a flow type of the flow, a link condition of the flow, and for each possible combination of flow type and link condition out of multiple flow types and multiple link conditions, the number of flows currently carried on the network that correspond to the respective combination.

13 Claims, 9 Drawing Sheets

(51) Int. Cl.
  G06F 9/38       (2018.01)
  H04J 11/00      (2006.01)
  H04L 1/00       (2006.01)
  H04L 5/00       (2006.01)
  H04L 12/26      (2006.01)
  H04M 1/253      (2006.01)
  H04W 84/12      (2009.01)
  H04W 88/16      (2009.01)

(52) U.S. Cl.
  CPC .......... *G06F 9/3802* (2013.01); *G06F 9/3804* (2013.01); *G06F 9/3836* (2013.01); *H04J 11/00* (2013.01); *H04L 1/0018* (2013.01); *H04L 5/006* (2013.01); *H04L 43/087* (2013.01); *H04M 1/2535* (2013.01); *H04W 84/12* (2013.01); *H04W 88/16* (2013.01)

(58) Field of Classification Search
  CPC .... H04L 5/006; H04L 43/087; H04M 1/2535; G06F 9/30145; G06F 9/3804; G06F 9/3836; G06F 9/3802; G06F 9/30043
  See application file for complete search history.

(56) References Cited

U.S. PATENT DOCUMENTS

| | | | |
|---|---|---|---|
| 5,353,421 | A | 10/1994 | Emma et al. |
| 6,662,294 | B1 | 12/2003 | Kahle et al. |
| 9,001,701 | B1 | 4/2015 | Zhang et al. |
| 9,444,888 | B2 | 9/2016 | Iyer |
| 9,456,033 | B2 | 9/2016 | Iyer |
| 2003/0227917 | A1* | 12/2003 | Maher, III .............. H04L 63/30 370/392 |
| 2007/0033197 | A1* | 2/2007 | Scherzer ................. H04L 63/10 |
| 2010/0192202 | A1 | 7/2010 | Ker |
| 2010/0275017 | A1 | 10/2010 | Iyer et al. |
| 2010/0290621 | A1 | 11/2010 | Muhanna et al. |
| 2011/0056087 | A1 | 3/2011 | Tinsley et al. |
| 2012/0084539 | A1 | 4/2012 | Nyland et al. |
| 2012/0226644 | A1* | 9/2012 | Jin ........................... G06N 3/08 706/19 |
| 2013/0067205 | A1 | 3/2013 | Plondke et al. |
| 2013/0343396 | A1 | 12/2013 | Yamashita et al. |
| 2015/0256417 | A1* | 9/2015 | Gelenbe ................. H04L 43/12 709/224 |

OTHER PUBLICATIONS

Shin et al, "Experimental Measurement of the Capacity for VoIP Traffic in IEEE 802.11 WLANs" (Year: 2007).*
Piamrat et al, "QoE-aware Admission Control for Multimedia Applications in IEEE 802.11 Wireless Networks" (Year: 2008).*
3gpp, "IP flow mobility and seamless Wireless Local Area Network (WLAN) offload; Stage 2" Specification #: 23.261, Available online at <https://portal.3gpp.org/desktopmodules/Specifications/SpecificationDetails.aspx?specificationId=833>, Retrieved on Nov. 6, 2018, 1 page.
3gpp, "Telecommunication management; Self-Organizing Networks (SON); Concepts and requirements" Specification #: 32.500, Available online at <http://www.3gpp.org/DynaReport/32500.htm>, Retrieved on Nov. 5, 2018, 1 page.
Aggarwal et al., "Prometheus: Toward quality-of-experience estimation for mobile apps from passive network measurements", In Proceedings of the 15th Workshop on Mobile Computing Systems and Applications, 2014, pp. 1-7.
Android Developers, "Android Debug Bridge (adb)", Available online at <https://developer.android.com/studio/command-line/adb>, Retrieved on Nov. 5, 2018, 39 pages.
Aruba Networks, "Wifi Performance Benchmark Testing", Aruba Networks AP-135 and Cisco AP3602i, pp. 1-20.

Aruba Networks, "Working with QoS for Voice and Video", Available Online at <http://www.arubanetworks.com/techdocs/ArubaOS_63_Web_Help/Content/ArubaFrameStyles/Voice_Video/QoS_or_Voice_and_Video.htm>, Retrieved on Nov. 5, 2018, 8 pages.
Aruba, "Mobility Controllers for Next-Gen Networks", Available Online at <www.arubanetworks.com/products/networking/controllers/>, Retrieved on Nov. 5, 2018, 4 pages.
Balachandran et al., "Developing a predictive model of quality of experience for Internet video", In ACM SIGCOMM Computer Communication Review, 2013, vol. 43, pp. 339-350.
Balachandran et al., "Modeling web quality-of-experience on cellular networks", In Proceedings of the 20th annual international conference on Mobile computing and networking MOBICOM, 2014, pp. 213-224.
Bari et al., "Automated network selection in a heterogeneous wireless network environment", IEEE Network, vol. 21, Issue 1, Jan./Feb. 2007, pp. 34-40.
Bernaille et al., "Early application identification", In Proceedings of the 2006 ACM CoNEXT Conference, 2006, pp. 6:1-6:12.
Bernaille et al., "Traffic classification on the fly", ACM SIGCOMM Computer Communication Review, vol. 36, Issue 2, 2006, 23-26.
Biswas et al., "Large-scale measurements of wireless network behavior", In Proceedings of the 2015 ACM Conference on Special Interest Group on Data Communication, SIGCOMM '15, ACM, 2015, pp. 153-165.
C.J. Lucena et al., "The Data Transform Programming Method: An Example for File Processing Problems," (Research Paper), In Proceedings of the 7th International Conference on Software Engineering, 1984, pp. 388-397, IEEE.
Chen et al., "Qoe Doctor: Diagnosing Mobile App Qoe with Automated UI Control and Cross-Layer Analysis", In Proceedings of the 2014 Conference on Internet Measurement Conference, IMC '14, ACM, 2014, pp. 151-164.
Chen et al., "Qos requirements of network applications on the internet", Information-Knowledge-Systems Management, vol. 4, 2004, 55-76.
Chen et al., "Quantifying skype user satisfaction", In Proceedings of the 2006 Conference on Applications, Technologies, Architectures, and Protocols for Computer Communications, SIGCOMM '06, ACM, 2006, pp. 399-410.
Cisco, "Cisco Network Admission Control (NAC)", Available Online at <http://www.cisco.com/c/en/us/solutions/enterprisenetworks/network-admission-control/index.html>, 2009, 2 pages.
Cisco, "Cisco Son Architecture", Available Online at <www.cisco.com/c/en/us/solutions/service-provider/sonarchitecture/index.html>, Retrieved on Nov. 5, 2018, 2 pages.
Cisco, "Miercom wireless controller comparative performance", Jun. 2015, 20 pages.
Cortes et al., "Support-vector networks", Machine learning, vol. 20, Issue 3, 1995, pp. 273-297.
Cover et al., "Elements of Information Theory (Wiley Series in Telecommunications and Signal Processing)", Wiley, 2006, 776 pages.
E2esoft, "Virtual camera software", Available Online at <https://web.archive.org/web/20180814185227/http://www.e2esoft.com/vcam/>, Aug. 14, 2018, 3 pages.
Fiedler et al., "A generic quantitative relationship between quality of experience and quality of service", IEEE Network, vol. 24, Issue 2, Mar. 2010, 36-41.
Firmin, Frédéric, "The Evolved Packet Core—3gpp", Available Online at <http://www.3gpp.org/technologies/keywords-acronyms/100-the-evolved-packet-core>, Retrieved on Nov. 5, 2018, 3 pages.
Gastpar et al., "On the capacity of wireless networks: The relay case", In INFOCOM 2002, Twenty-First Annual Joint Conference of the IEEE Computer and Communications Societies Proceedings, IEEE, 2002, pp. 1577-1586.
Github, "Android View Client", Available Online at <https://github.com/dtmilano/AndroidViewClient/wiki>, Retrieved on Nov. 5, 2018, 10 pages.
Higgins et all., "Intentional networking: Opportunistic exploitation of mobile network diversity", In Proceedings of the Sixteenth Annual International Conference on Mobile Computing and Networking, MobiCom '10, ACM, 2010, pp. 73-84.

(56) References Cited

OTHER PUBLICATIONS

Ian R. Bratt et al., "Predicate-Based Transformations to Eliminate Control and Data-Irrelevant Cache Misses," (Research Paper), in Proceedings of the First Workshop on Explicitly Parallel Instruction Computing Architectures and Compiler Techniques, Dec. 2001, pp. 1-8.

ip.access, "nanoLTE Access Points", Carrier grade small cell radio solutions, Available online at <http://www.ipaccess.com/en/lte>, Retrieved on Nov. 6, 2018, 2 page.

Jiang et al., "Eona: Experience-oriented network architecture", In Proceedings of the 13th ACM Workshop on Hot Topics in Networks, Hotnets '14, ACM, 2014, pp. 1-7.

Kim et al., "Prism: Improving the performance of inverse-multiplexed TCP in wireless networks", IEEE Transactions on Mobile Computing, vol. 6, Issue 12, Dec. 2007, 1297-1312.

Kodialam et al., "Characterizing the capacity region in multi-radio multi-channel wireless mesh networks", In Proceedings of the 11th annual international conference on Mobile computing and networking, MobiCom'05, ACM, 2005, pp. 73-87.

Krasnyansky et al., "Universal tun/tap device driver", Available online at <https://www.kernel.org/doc/Documentation/networking/tuntap.txt>, Retrieved on Nov. 6, 2018, 4 page.

Leong et al., "Call admission control for integrated on/off voice and best-effort data services in mobile cellular communications", Communications, IEEE Transactions on Communications, vol. 52, No. 5, May 2004, 778-790.

Livelab, "LiveLab: Measuring wireless networks and smartphone users in the field", LiveLab traces, LiveLab dataset from rice university, Available online at <http://livelab.recg.rice.edu/traces.html>, Retrieved on Nov. 6, 2018, 5 page.

Mahindra et al., "A practical traffic management system for integrated LTE-Wife networks", In Proceedings of the 20th Annual International Conference on Mobile Computing and Networking, MobiCom '14, 2014, pp. 189-200.

Naghshineh et al., "Qos provisioning in micro-cellular networks supporting multimedia traffic", INFOCOM '95 Proceedings of the Fourteenth Annual Joint Conference of the IEEE Computer and Communication Societies, vol. 3, pp. 1075-1084.

NS-3, "ns-3 Network Simulator", Available online at <www.nsnam.org/>, Retrieved on Nov. 6, 2018, 4 page.

Openepc, "OpenEPC by CND", Available online at <http://www.openepc.com/>, Retrieved on Nov. 6, 2018, 2 page.

Pefkianakis et al., "Characterizing home wireless performance: The gateway view", IEEE Conference on Computer Communications, 2015, pp. 2713-2731.

Piamrat et al., "QoE-Aware Admission Control for Multimedia Applications in IEEE 802.11 Wireless Networks", In Vehicular Technology Conference, 2008, pp. 1-5.

Qualcomm, "Qualcomm Extends LTE to Unlicensed Spectrum to Enhance Mobile Experiences and Help Operators Meet Network Capacity Demand", Press Release, Available online at <https://www.qualcomm.com/news/releases/2015/02/26/qualcomm-extends-life-unlicensed-enhance-mobile-experiences-and>, Retrieved on Nov. 6, 2018, 5 page.

Qualcomm, "Qualcomm wifi son", Available online at <www.qualcomm.com/videos/qualcomm-wi-fi-son>, Jan. 5, 2016, 2 pages.

Shin et al., "Experimental measurement of the capacity for voip traffic in IEEE 802.11 wlans", IEEE INFOCOM 2007—26th IEEE International Conference on Computer Communications, 2007, pp. 2018-2026.

Song et al., "Improving voice and data services in cellular/wlan integrated networks by admission control", Wireless Communications, IEEE Transactions, 2007, 4025-4037.

Toumpis et al., "Capacity regions for wireless ad hoc networks", Wireless Communications, IEEE Transactions, vol. 2, No. 4, Jul. 2003, pp. 736-748.

Veldhuizen, T., "CVonline: The Evolving, Distributed, Non-Proprietary, On-Line Compendium of Computer Vision" Measures of image quality, available online at <https://web.archive.org/web/20101224021625/http://homepages.inf.ed.ac.uk/rbf/CVonline/>, 2010, 3 pages.

YouTube, "Youtube android player api", Available online at <https://developers.google.com/youtube/android/player/>, Retrieved on Nov. 6, 2018, 3 pages.

\* cited by examiner

DETERMINING WHETHER A FLOW IS TO BE ADDED TO A NETWORK

RELATED APPLICATIONS

This application is a continuation and claims the benefit of U.S. patent application Ser. No. 15/179,872, filed on Jun. 10, 2016, the contents of which are incorporated herein by reference in its entirety.

DESCRIPTION OF RELATED ART

Networks communicably connect two or more devices, and may include various network components (such as access points, routers, switches, base-stations, etc.) that may be interconnected via assorted communications media (such as electrical cable, fiber optic cable, wireless communication channels, etc.). The characteristics and/or performance of a network can be measured by a variety of metrics. For example, a bandwidth or throughput metric may measure how many bits per second the network can communicate. As another example, a latency or delay metric may measure how long it takes some unit of data (such as a data packet) to traverse the network from source to destination (for one-way latency) or from source to destination and then back to source (for round-trip latency).

In certain contexts, a network operator may institute policies in an attempt to ensure that their network provides a specific level of performance for certain metrics. Such a guarantee of a certain level of performance for a particular network metric may be referred to as a "Quality of Service" (QoS) guarantee. Certain metrics have over time come to be associated with QoS guarantees, and these metrics may be referred to herein as "QoS metrics. Such QoS metrics may include, among others: bandwidth/throughput, latency/delay, loss, bit-error-rate (BER), and jitter.

The overall subjective experience of a user with the network in relation to a particular data flow for a particular application may be referred to as the overall Quality-of-Experience (QoE) for the data flow. For example, a data flow for a voice-over-IP (VoIP) application that results in the user experiencing a jittery VoIP call might have poor QoE, whereas a VoIP data flow that results in the user experiencing a smooth artifact-free VoIP call might have acceptable QoE. The overall QoE associated with a data flow may be based on multiple aspects of the user's experience, some of which may be objectively measurable. For example, metrics such as stall rates, frame drops, page load times, and the like may be relevant to the overall QoE a user experiences.

DETAILED DESCRIPTION

Figure 1:
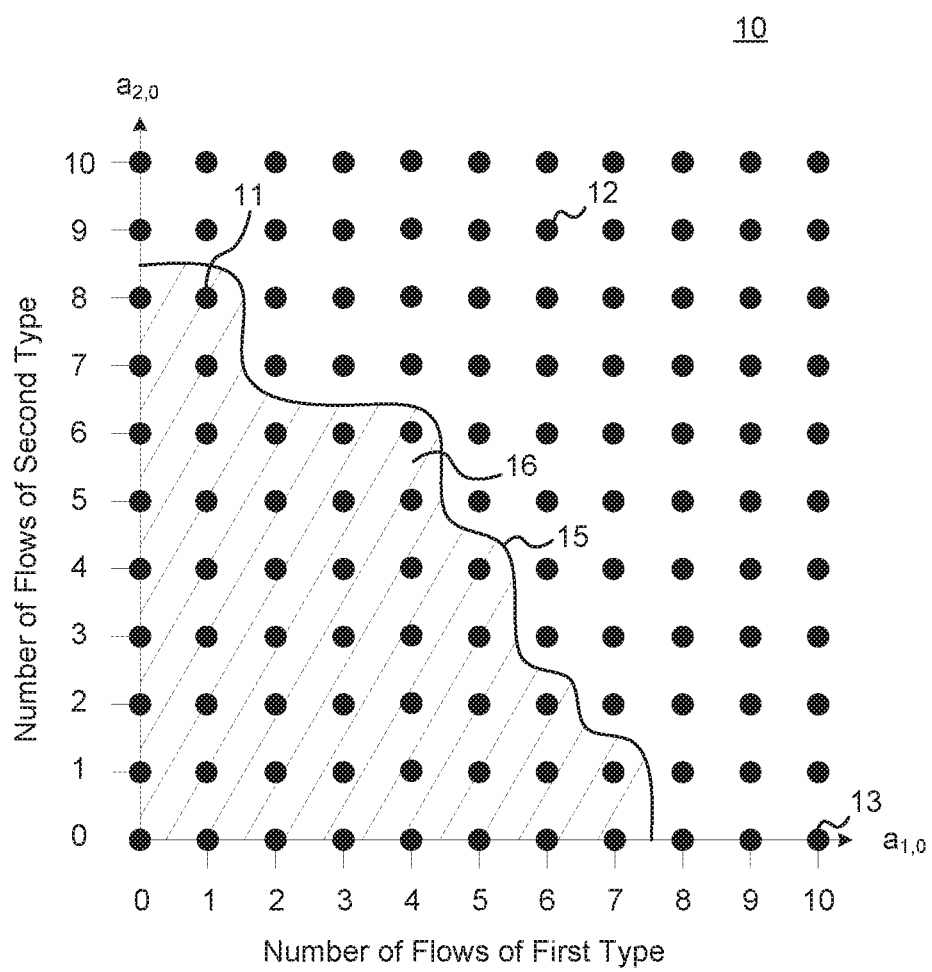
FIG. 1 is an illustration of an example space in which network states/traffic matrices of a network have been graphed, including a representation of the experiential capacity of the network.

One of the reasons that a network operator may measure QoS metrics or perhaps even guarantee a particular level of QoS may be that the network operator would like to ensure that all of the users of the network have satisfactory subjective experiences in using the network, i.e., that all users have acceptable QoE. The network operator may believe that the particular QoS metric(s) they are measuring and/or guaranteeing may be causally related to the users' QoE (although it may not always be clear exactly how they are related), and therefore that providing sufficient QoS is likely to result in acceptable QoE for the users.

Although it may be true that certain QoS metrics are causally related to overall QoE, the relationships between various QoS metrics of the network and the overall QoE of a data flow can be very complex, depending on numerous factors such as the type of application associated with the data flow, the conditions of the network link (e.g., signal strength), and so on. Thus, it is not always clear which QoS metric(s) should be focused on in order to provide a good experience to a given user (much less what levels of these metrics are optimum). In addition, when there are multiple users of a network, there may be multiple different types of data flows with different link conditions, and each flow's QoE may be affected differently by the various QoS metrics, and thus it can be difficult to know which QoS metrics (if any) should be focused on in order to ensure that all of the diverse flows have good QoE. Moreover, the users' data flows may impact one another's QoE in complex ways depending on the particular mix of flow types and link conditions present on the network at that time, and it may not be clear how these interactions would affect which QoS metric(s) should be focused on by the network operator. For example, QoS metrics alone might not be able to answer a question such as "how does the QoE of an existing VoIP flow change when a new streaming video flow enters the network?" As a result, although QoS metrics may be helpful in certain contexts, network policies based solely on monitoring/guaranteeing QoS metrics might not always be able to achieve their intended goal of providing acceptable QoE to users, or might achieve this goal at the cost of grossly overprovisioning resources.

Thus, the present disclosure provides new tools for helping a network operator to provide acceptable QoE to users that are able to cope with these complexities. In particular, various examples described herein may assess a state of the network in terms of the numbers of data flows on the network that correspond to each combination of flow type and link condition (hereinafter, a "network state"), and may determine whether new data flows can be added to the network based on the current network state and on the flow type and link condition of the new data flow. In certain examples, a set of network states that will result in acceptable QoE for the users of the network may be determined in advance (for example, by a machine-learning based classification engine), and new flows may admitted or rejected based on whether the resulting network state would be within that set of acceptable network states. Such a process of determining whether to admit or reject a new data flow by deciding whether the resulting network state would be within or without a set of acceptable network states may be much easier and more effective than attempting to explicitly determine how the addition of a new flow will affect the QoS metrics of the network and how this in turn will affect the QoE of each user.

As used herein, "QoS" or "QoS metric" refers to a metric that measures some aspect of the capabilities of a network (or component thereof) to provide a service or the performance of the network (or component thereof) in providing a service, and that is measurable from the perspective of the network (or component thereof). For example, QoS metrics may include, among others: bandwidth/throughput, latency/delay, loss, BER, and jitter. Although the term QoS may have arisen in a context of QoS grantees, as used herein a "QoS" metric is not necessarily a metric that is guaranteed by the network.

As used herein, the overall QoE associated with a data flow refers to the quality of the user's overall subjective experience with a data flow, whereas a QoE metric refers to a measurable phenomenon that is experienced by (e.g., perceived by) the user as the user interacts with the application that is associated with the data flow. In other words, the overall QoE of a data flow may be related to a combination of one or more aspects of the user's experience, and some of these aspects may be measured as QoE metrics. For example, QoE metrics may include: number or frequency of stalls (freezes), number or frequency of frame drops, page load time, startup delay, frame rate, resolution, peak-signal-to-noise ratio (measures the relative degradation in the frame quality of a video between sent and received frames), and the like. In certain circumstances, a single QoE metric may be strongly indicative of the overall QoE of a particular type of data flow, and thus the QoE metric may be used as a good estimation of overall QoE for the data flow. Different types of data flows may have different QoE metrics that are most relevant thereto, and not all QoE metrics are relevant to all types of data flows. QoE metrics differ from QoS metrics in that the QoE metrics measure things experienced directly by the user (for example, page load time), whereas the QoS metrics measure the performance of the network from the perspective of the network (for example, total bandwidth).

The new example techniques described herein may be understood in relation to a new measure referred to herein as the "experiential capacity" of the network. The experiential capacity of a network may be thought of as a measurement of how much traffic a network can carry while still providing acceptable QoE to its users, with the "how much traffic" being specified in terms of the numbers of data flows of each combination of flow type and link condition, rather than being specified in bits, bits per second, or some other QoS metric. In other words, the experiential capacity of a network may correspond to the set of all network states (where "network state" is understood as defined above) that result in acceptable QoE. More specifically, if the possible network states of a given network were graphed as points in a space, then the experiential capacity of the network may be thought of as the boundary of a region in that space that would include all of the network states that result in acceptable QoE and would exclude all of the network states that result in unacceptable QoE.

In certain examples, the experiential capacity (i.e., the boundary of the region containing all of the acceptable network states) may be determined by a machine-learning engine. The determination of the experiential capacity implicitly specifies each network state that is in the set of acceptable network states without having to explicitly specify each such state (in the same way, for example, that specifying the perimeter of a circle implicitly specifies all of the points contained in the circle). Thus, determining the experiential capacity of the network may allow the network operator to determine the full set of acceptable network states without having to attempt to explicitly measure the QoE of each possible network state and then sort each of the network states into the acceptable set or an unacceptable set based on their respective QoEs. This may be useful in networks in which there may be many potential users, many potential types of data flows, and many possible link conditions (which describes a large proportion of networks today), since in these scenarios the number of possible network states is extremely large, and attempting to explicitly measure the QoE of each such state may be infeasible.

The aforementioned network states may be modeled by a traffic matrix. As noted above, the network state specifies the numbers of data flows for each combination of flow type and link condition; the corresponding traffic matrix represents each of these numbers of data flows as an element of a matrix, with each row of the matrix corresponding to a different flow type and each column of the matrix corresponding to a different link condition. In particular, if there are M different types of data flows and N different link conditions that are being considered, then a traffic matrix of the network may be an M×N matrix having elements $a_{i,j}$, where the index i indicates a type of data flow (i=0, . . . , M) and the index j indicates a type of link condition (j=0, . . . , N). Thus, the element $a_{i,j}$ specifies the number of data flows being carried by the network that are of the $i^{th}$ type of flow and have the $j^{th}$ link condition. In certain examples described herein, there are multiple types of data flows and multiple link conditions, i.e., m≥2 and n≥2. The traffic matrix may be represented as:

$$\begin{bmatrix} a_{1,1} & \cdots & a_{1,N} \\ \vdots & \ddots & \vdots \\ a_{M,1} & \cdots & a_{M,N} \end{bmatrix}$$

For example, if the types of data flows represented by the traffic matrices include VoIP flows (first flow type, i=1) and video streaming flows (second flow type, i=2) and the link conditions include high signal-to-noise ratio (SNR) (first link condition, j=1) and low SNR (second link condition, j=2), then the traffic matrix $$\begin{bmatrix} 1 & 3 \\ 2 & 0 \end{bmatrix}$$

indicates that there are six flows total on the network, that there is one flow that is a VoIP flow with high SNR (i.e., $a_{1,1}=1$), that there are three flows that are VoIP flows with low SNR (i.e., $a_{1,2}=3$), there are two flows that are video streaming flows with high SNR (i.e., $a_{2,1}=2$), and there are no flows that are video streaming flows with low SNR (i.e., $a_{2,2}=0$).

As described above, the set of acceptable network states could be graphed in a space, and the experiential capacity of the network could be considered to be the boundary of a region in that space. When the network states are represented as traffic matrices, the aforementioned graphing of network states corresponds to a graphing of traffic matrices in an (M×N) dimensional traffic matrix space in which each dimension of the traffic matrix space corresponds to one of the elements $a_{i,j}$. In the traffic matrix space, each discrete point in the space corresponds to a distinct traffic matrix.

For example, suppose there are two types of data flows (M=2) and one type of link condition (N=1), then the set of all possible traffic matrices could be represented in the traffic matrix space 10 as shown in FIG. 1. For example, the point 11 corresponds to the traffix matrix $$T = \begin{bmatrix} 1 \\ 8 \end{bmatrix},$$

the point 12 corresponds to the traffic matrix $$T = \begin{bmatrix} 6 \\ 9 \end{bmatrix},$$

and the point 13 corresponds to the traffic matrix $$T = \begin{bmatrix} 10 \\ 0 \end{bmatrix}.$$

The experiential capacity of the network in this example is indicated by the boundary line 15, which defines the region 16. In this example, the traffic matrix corresponding to point 11 results in acceptable QoE, since it is within the region 16, while the traffic matrices corresponding to points 12 and 13 do not result in acceptable QoE since they are outside of the region 16. This simplified example of a two-dimensional traffic matrix space has been provided to aid the understanding, but it should be understood that in certain examples, m≥2 and n≥2, and hence the traffic matrix space may have four or more dimensions in certain examples. In examples in which the traffic matrix space has N dimensions, the experiential capacity may correspond to the surface of an N-dimensional region in that space.

As noted above, there may be multiple different types of data flows. The terms "data flow" or "flow" refer herein to traffic generated by a particular source-destination pair, with the type of the flow being determined by a type or class of application that the data flow is generated by or for. For example, a data flow generated by a VoIP application may be one type of data flow (a VoIP data flow), whereas a data flow generated by a video streaming application may be a different type of data flow (a video streaming data flow). Examples of application classes include video streaming, VoIP, web-browsing, conferencing, file-sharing, backing-up, instant messaging, interactive gaming, downloading, etc., and each of these application classes may have a corresponding type of data flow. In certain examples, the network states/traffic matrices described herein may each represent at least two different types of data flows. The more types of data flows that are represented in the network states/traffic matrices, the more accurate the determination of the experiential capacity may be. However, the more types of data flows that are represented in the network states/traffic matrices, the more computational complexity may be involved in determining the experiential capacity.

As noted above, the network states/traffic matrices may also represent multiple different link conditions of data flows. As used in this context, a "link condition" is a specific range of measurements of a metric that is related to the nature or quality of a communications link over which a data flow is carried. An example of such a metric is a signal-to-noise ratio (SNR) of a wireless communication link, and thus examples of the various "link conditions" represented in the network states/traffic matrices may include specific ranges of SNR measurements. For example, a first link condition may be {SNR<b}, a second link condition may be {b≤SNR≤c}, and a third link condition may be {c<SNR}, where b and c are specific values of SNR measurements. In this example, a spectrum of possible SNR values is divided into three ranges, and each range is considered to be a distinct "link condition". Thus, in this example, if a given data flow has an SNR that is between b and c, it may be counted in the network state/traffic matrix as a data flow having the second link condition. The number of link conditions can be as few as two, and as many as is feasible to calculate. The more distinct link conditions that are represented in the network states/traffic matrices, the more accurate the determination of the experiential capacity may be. However, the more distinct link conditions that are represented in the network states/traffic matrices, the more computational complexity may be involved in determining the experiential capacity. Other examples of metrics that are related to the nature or quality of links include signal-to-interference-plus-noise ratio (SINR), reference signal received quality (RSRQ), received signal strength indicator (RSSI), reference signal received power (RSRP), and channel quality indicator (CQI).

As noted above, the experiential capacity of a network may be determined by a machine-learning engine. Any machine-learning engine may be used, such as, for example, a support vector machine. The machine-learning engine may determine the experiential capacity through a process of supervised learning. In a supervised learning phase, the machine-learning engine may be fed example traffic matrices together with indications of whether each example traffic matrix represents an acceptable QoE or an unacceptable QoE. Based on this supervised learning, the machine-learning engine may estimate the experiential capacity of the network. As the machine-learning engine processes more and more example traffic matrices, the estimation of the experiential capacity of the network will get more and more accurate. The accuracy can be periodically checked during the learning phase by asking the engine to classify example traffic matrices based on the current estimation of the experiential capacity, and checking the percentage of these matrices that the engine classifies correctly. Once a desired level of accuracy is reached (for example, 90% accuracy), the supervised learning phase may be ended and the engine's current estimation of the experiential capacity may be used by the network operator as if it were the actual experiential capacity of the network.

The example traffic matrices that are fed to the machine-learning engine during the learning phase may be obtained by observing actual traffic of the network. In other words, each example traffic matrix may correspond to a network state that has actually occurred on the network at some point during the training phase. During this learning phase, flow admission control based on the experiential capacity is not exercised, so that the example traffic matrices can include as wide a variety of network states as possible.

The indication of whether an example matrix represents an acceptable QoE or an unacceptable QoE may be generated by measuring QoS metrics of the network for each example traffic matrix, translating the QoS metrics into QoE metrics for each data flow in the example traffic matrix, and classifying the example traffic matrix as having acceptable overall QoE or unacceptable overall QoE based on the QoE metrics of the data flows. The translating of QoS metrics into QoE metrics for each data flow may be accomplished, for example, by producing a mapping of QoS metrics to QoE metrics in advance, and then using this mapping to convert measured QoS metrics into QoE metrics.

In certain examples, the traffic matrix may be classified as having acceptable or unacceptable QoE based on comparisons of the QoE metrics to threshold values. In certain examples, the classification of the traffic matrix may be based on per-flow thresholds, meaning that the example traffic matrix may be classified as having acceptable QoE if all of the individual QoE metrics of the data flows represented in the traffic matrix compare favorably to their respective thresholds (i.e., if each individual flow has acceptable QoE). In other examples, the classification of the traffic matrix may be based on an aggregate threshold, meaning that the example traffic matrix may be classified as having acceptable QoE if an aggregation of the QoE metrics of the data flows represented in the traffic matrix compares favorably to a threshold. The aggregation of QoE metrics may be some statistical aggregation of the per-flow QoE metrics, such as the average (weighted, or not), the sum (weighted, or not), the median, or the like.

The mapping of QoS metrics to QoE metrics may be determined by empirical modeling. For example, a test device may be connected to a network by a network administrator and caused to run various user applications, and various QoE metrics experienced by the test device may be measured along with QoS metrics of the network. This data may then be used in a regression analysis to find the parameters of a function that relates one or more QoS metrics to a QoE metric. For example, a function may be determined that relates bandwidth (a QoS metric) as an independent variable to page load time (a QoE metric). Any form of parametric equation may be used in the regression analysis. In certain examples, an equation in the form of $$QoE=\alpha+\beta e^{-\gamma QoS}$$

may provide useful results, where $\alpha$, $\beta$, and $\gamma$ are parameters of the equation.

Figure 2A:
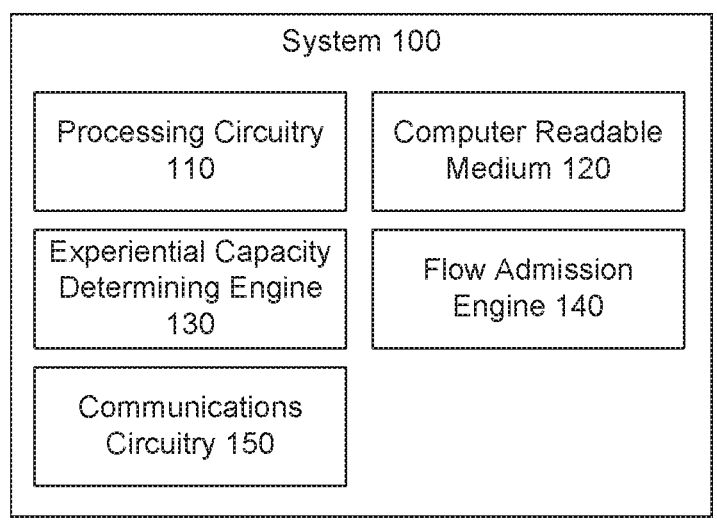
FIG. 2A is an illustration of an example system.

The techniques described above may be employed in various example methods, systems, devices, computer program products, and the like. For example, FIG. 2A illustrates an example system 100 that may be configured to perform some or all of the processes descried above. The example system 100 may include processing circuitry 110, a computer readable medium 120, an experiential capacity determining engine 130, and a flow admission engine 140. In certain examples of the system 100, communications circuitry 150 may also be included in the system 100. The communications circuitry 150 may be, for example, circuitry for wired communication (such as, for example, a network interface card) and/or circuitry for wireless communication (such as, for example, antennas and wireless communication chipsets).

The processing circuitry 110 may be any circuitry capable of executing machine-readable instructions, such as a central processing unit (CPU), a microprocessor, a microcontroller, a digital signal processor (DSP), a field-programmable gate array (FPGA), an application-specific instruction set processor (ASIP), etc. The computer readable medium 120 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The computer readable medium 120 may store machine-readable instructions that, when executed by the processing circuitry 110, cause the processing circuitry 110 to perform the operations described herein. In particular, the machine-readable instructions include instructions corresponding to the experiential capacity determining engine 130 and the flow admission engine 140.

The experiential capacity determining engine 130 may be to determine an experiential capacity of a network 200. For example, the experiential capacity determining engine 130 may determine an experiential capacity of the network 200 by training a machine-learning engine in the manner described above, and using the estimated experiential capacity generated by the machine-learning engine as the experiential capacity of a network 200. For example, experiential capacity determining engine 130 may perform operations corresponding to some or all of the operations described with regard to the processes of FIGS. 5, 7, and 8.

Figure 2B:
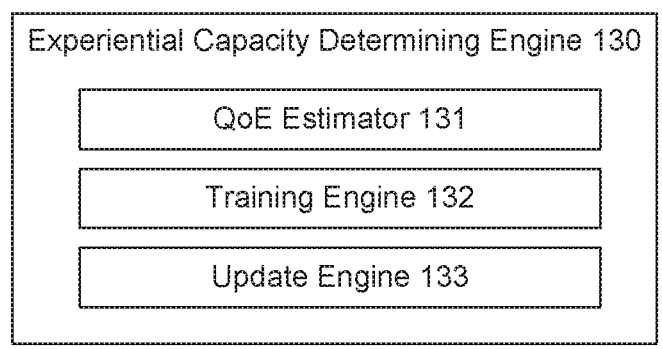
FIG. 2B is an illustration of an example experiential capacity determining engine that may be included in the system of FIG. 2A.

In certain examples, as illustrated in FIG. 2B, the experiential capacity determining engine 130 may include a QoE estimator 131, a training engine 132, and an update engine 133. The QoE estimator 131 may classify network states/traffic matrices as having acceptable or unacceptable QoE. For example, the QoE estimator 131 may classify the network states/traffic matrices based on measured QoS metrics and a mapping of QoS metrics to QoE metrics. For example, the QoE estimator 131 may classify the network states/traffic matrices based on per-flow QoE threshold(s), or based on aggregate QoE threshold(s). For example, the QoE estimator 131 may perform operations corresponding to some or all of the operations described with regard to the process of FIG. 8. The training engine 132 may collect example traffic matrixes during a supervised training phase based on observing actual traffic of the network 200, and may feed the example traffic matrixes along with their QoE classification to a machine-learning engine for supervised training. The training engine 132 may continue to train the machine-learning engine until a desired level of accuracy is reached, at which point the current experiential capacity estimated by the machine-learning engine may be designated as the experiential capacity of the network 200. For example, training engine 132 may perform operations corresponding to some or all of the operations described with regard to the process of FIG. 5. The update engine 133 may, after the supervised learning phase, periodically feed additional example traffic matrices to the machine-learning engine so as to update the estimated experiential capacity of the machine-learning engine. This may allow the system 100 to adapt to changes that occur in the network 200 over time.

The flow admission engine 140 may determine whether a flow is to be added to the network 200 based on the experiential capacity of the network. For example, the flow admission engine 140 may determine whether a flow is to be added to the network 200 based on whether the addition of the flow would cause the network to have a network state that is outside of the set of network states indicated by the experiential capacity. For example, the flow admission engine 140 may perform operations corresponding to some or all of the operations described with regard to the processes of FIGS. 6 and 7.

Figure 3A:
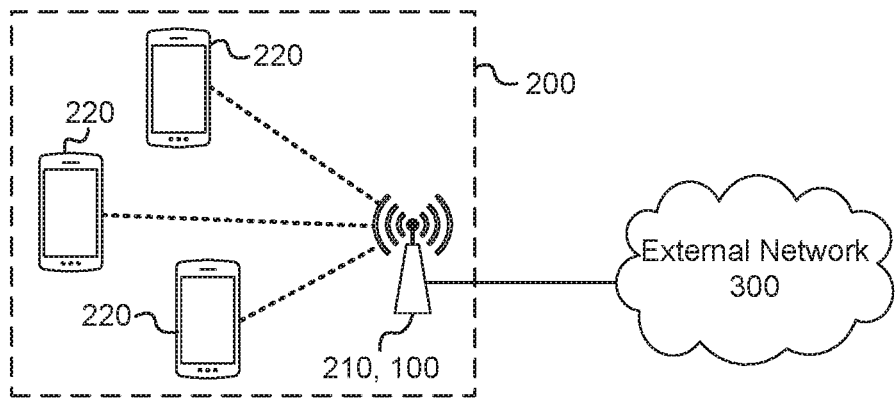
FIG. 3A is an illustration of an example network configuration in which the system of FIG. 2A may be implemented.

The example system 100 may be implemented in a variety of configurations. For example, in FIG. 3A the system 100 may be included as part of an access point 210 of the network 200. For example, in a Wi-Fi network, the system 100 could be part of a Wi-Fi access point. As another example, in a long-term-evolution (LTE) network, the system 100 could be part of an eNode B or radio base station. In these examples, the communications circuitry 150 may include wireless communications circuitry for operating as a wireless access point, in addition to wired communication circuitry for connecting the access point to the external network 300. The network 200 may include client devices 220 that are communicably connected to the external network 300 via the access point 210/100. The data flows may be flows between applications resident on the client devices 220 and corresponding devices or applications that are connected to the external network 300 (such as an application server).

Figure 3B:
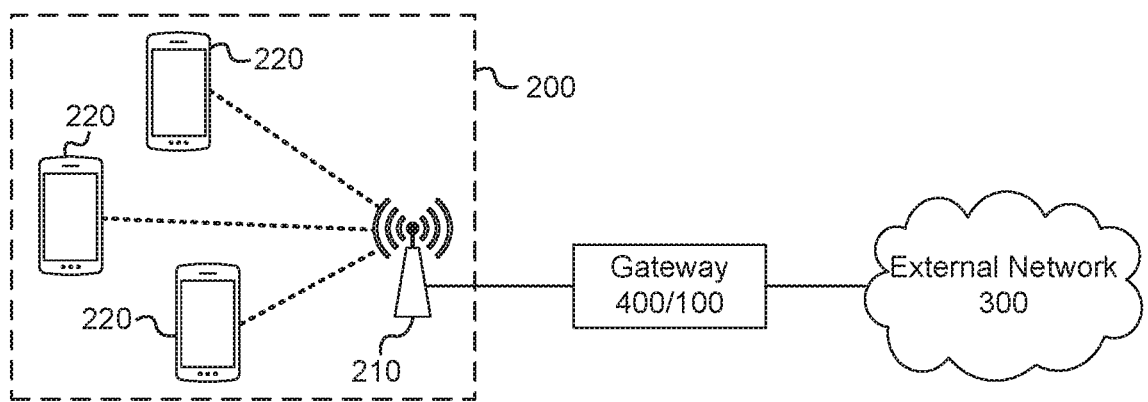
FIG. 3B is another illustration of an example network configuration in which the system of FIG. 2A may be implemented.

As another example, in FIG. 3B, the system 100 may be included in a gateway 400/100 that connects an access point 210 to an external network 300 (such as the internet). For example, in a Wi-Fi network, the system 100 could be part of a Wi-Fi gateway. As another example, in a long-term-evolution (LTE) network, the system 100 could be part of a packet-data-network (PDN) gateway or serving gateway. In such an examples, the gateway 400 may be connected to multiple networks (not illustrated) that are similar to the network 200 via multiple access points (not illustrated) that are similar to the access point 210, and may be configured to determine the experiential capacity of each such network. In these examples, the communications circuitry 150 may be, for example, a network interface card that provides a communications interface between the gateway 400/100 and the access point 210 and external network 300. The network 200 of FIG. 3B may be similar to that of the network 200 of FIG. 3A, with the exception that the system 100 may be located within the gateway 400/100 rather than within the access point 210.

Figure 3C:
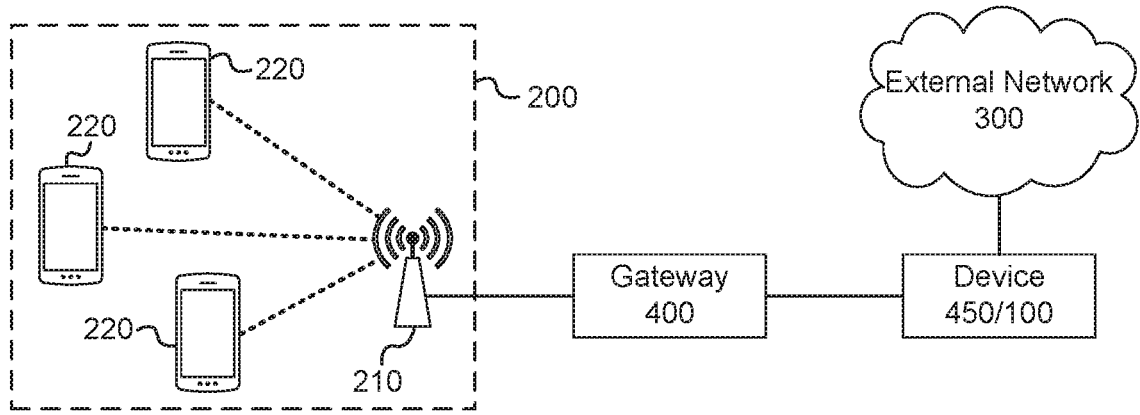
FIG. 3C is another illustration of an example network configuration in which the system of FIG. 2A may be implemented.

As another example, in FIG. 3C, the system 100 may be included in a device 450 that is a dedicated device for performing example techniques described herein. Such a device 450 may be, for example, connected between a gateway 400 of the network 200 and the internet. As another example, the device 450 may be connected directly between the access point 210 and the internet, with no gateway therebetween (not illustrated). As another example, the device 450 may be connected to the access point 210 or a gateway 400 without necessarily being interposed in a data path between the access point 210 and a network (in which case, flow control operations of the device 450 could be performed by issuing commands to other devices, such as the gateway 400, that are in a position to control flows). In these examples, the communications circuitry 150 may be, for example, a network interface card that provides a communications interface between the device 450 and the other components to which the device 450 is connected. The network 200 of FIG. 3C may be similar to that of the network 200 of FIG. 3A, with the exception that the system 100 may be located within the device 450/100 rather than within the access point 210. The gateway 400 of FIG. 3C may be similar to the gateway 400/100 of FIG. 3B, with the exception that the system 100 is not located within the gateway 400 in FIG. 3C.

Figure 4A:
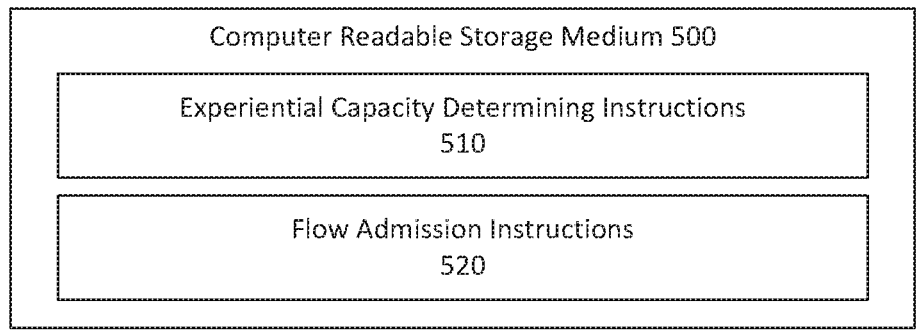
FIG. 4A is an illustration of an example computer readable storage medium.

FIG. 4A illustrates an example computer readable storage medium 500. The computer readable storage medium 500 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The computer readable medium 500 may store machine-readable instructions that, when executed by processing circuitry, cause the processing circuitry to perform some or all of the operations described herein. In particular, the example computer readable storage medium 500 may include experiential capacity determining instructions 510 and flow admission instructions 520.

Figure 4B:
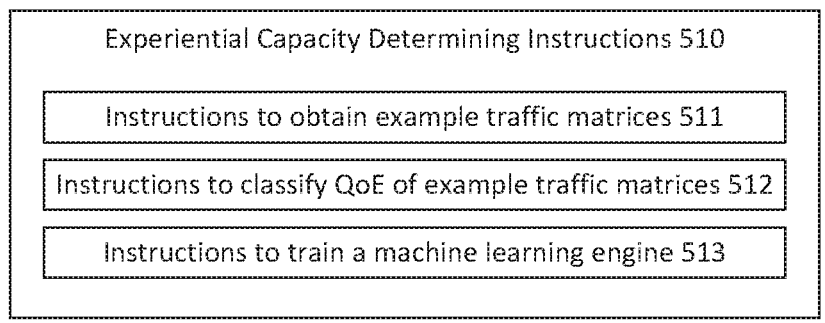
FIG. 4B is an illustration of example experiential capacity determining instructions.

The experiential capacity determining instructions 510 may be instructions to determine an experiential capacity region of a network. For example, the experiential capacity determining instructions 510 may include instructions to perform operations corresponding to some or all of the operations described with regard to the processes of FIGS. 5, 8, and 9. For example, as illustrated in FIG. 4B, the experiential capacity determining instructions 510 may include instructions to obtain example traffic matrices 511, instructions to classify QoE of the example traffic matrices 512, and instructions to train a machine-learning engine 513. The instructions to obtain example traffic matrices 511 may be to observe actual traffic of the network and to obtain the example traffic matrices based thereon, and may correspond, for example, to the operations of block 501 in FIG. 5. The instructions to classify the QoE of example traffic matrices 512 may include instructions to perform operations corresponding to some or all of the operations described with regard to blocks 802-804 and/or blocks 901 and 902 of the processes of FIGS. 8 and 9. The instructions to train a machine-learning engine 513 may be instructions to feed the example matrices to the machine-learning engine together with their corresponding QoE classification, and may correspond, for example, to the operations of block 503 in FIG. 5.

Figure 4C:
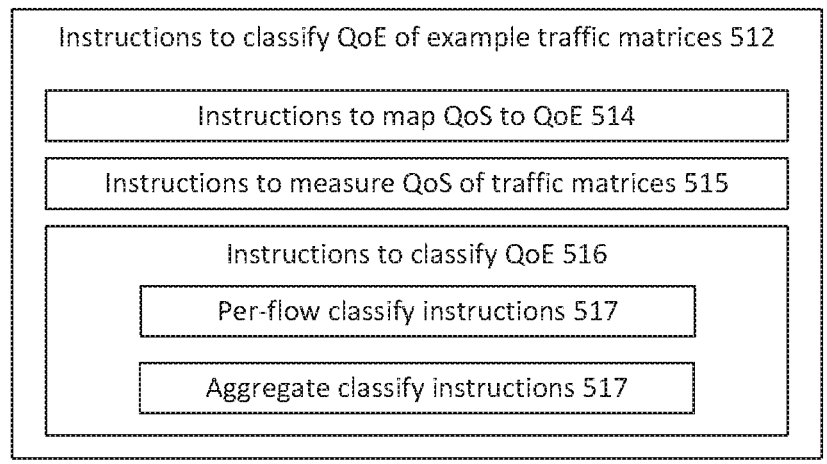
FIG. 4C is an illustration of example instructions to classify quality of experience of example traffic matrices.

In particular, as illustrated in FIG. 4C, the instructions to classify the QoE of example traffic matrices 512 may include, instructions to map QoS to QoE 514, instructions to measure QoS of traffic matrices 515, and instructions to classify QoE 516. The instructions to map QoS to QoE 514 may include, for example, instructions to obtain or generate a map between QoS metrics and QoE metrics (see, for example, blocks 801, 901, and/or 902). The instructions to classify QoE 516 may, for example, include instructions to perform operations corresponding to some or all of the operations described with regard to blocks 802-804 of FIG. 8. In particular, the instructions to classify QoE 516 may include per-flow classify instructions 517 that are to classify example traffic matrices as having acceptable QoE based on per-flow QoE metrics and aggregate classify instructions 517 that are to classify example traffic matrices as having acceptable QoE based on an aggregation of QoE metrics.

Figure 5:
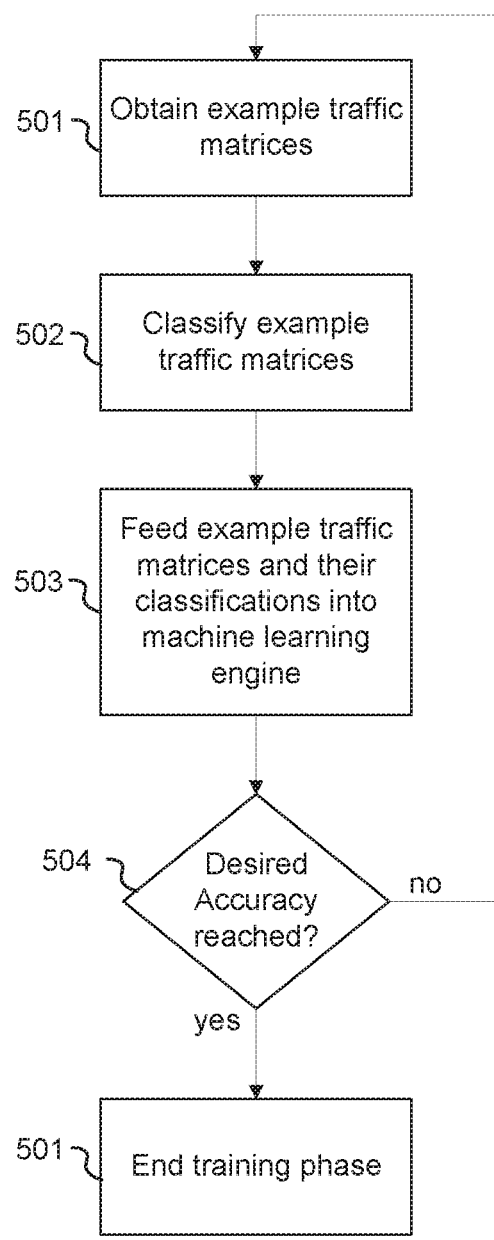
FIG. 5 is flow chart illustrating an example process of training a machine-learning engine to determine the experiential capacity of a network.

FIG. 5 illustrates an example method of training a machine-learning engine during a supervised learning phase. In block 501, example network states/traffic matrices are obtained by observing actual traffic on the network. In block 502, the example traffic matrices are classified as having acceptable of unacceptable QoE. For example, any of the techniques described above for classifying network states/traffic matrices may be used. In block 503, the example network states/traffic matrices together with their corresponding QoE classifications are fed into a machine-learning engine for supervised learning. In block 504, it is determined whether a desired level of accuracy has been reached. If the answer is no, then the process returns to block 501 to collect more traffic matrices. If the answer is yes, then the process proceeds to block 501, in which the supervised learning phase is ended. Upon ending the learning phase, the current estimation of the experiential capacity that the machine-learning engine has developed may be used as the experiential capacity by the network operator in instituting policies, such as, for example, flow admission decisions.

Figure 6:
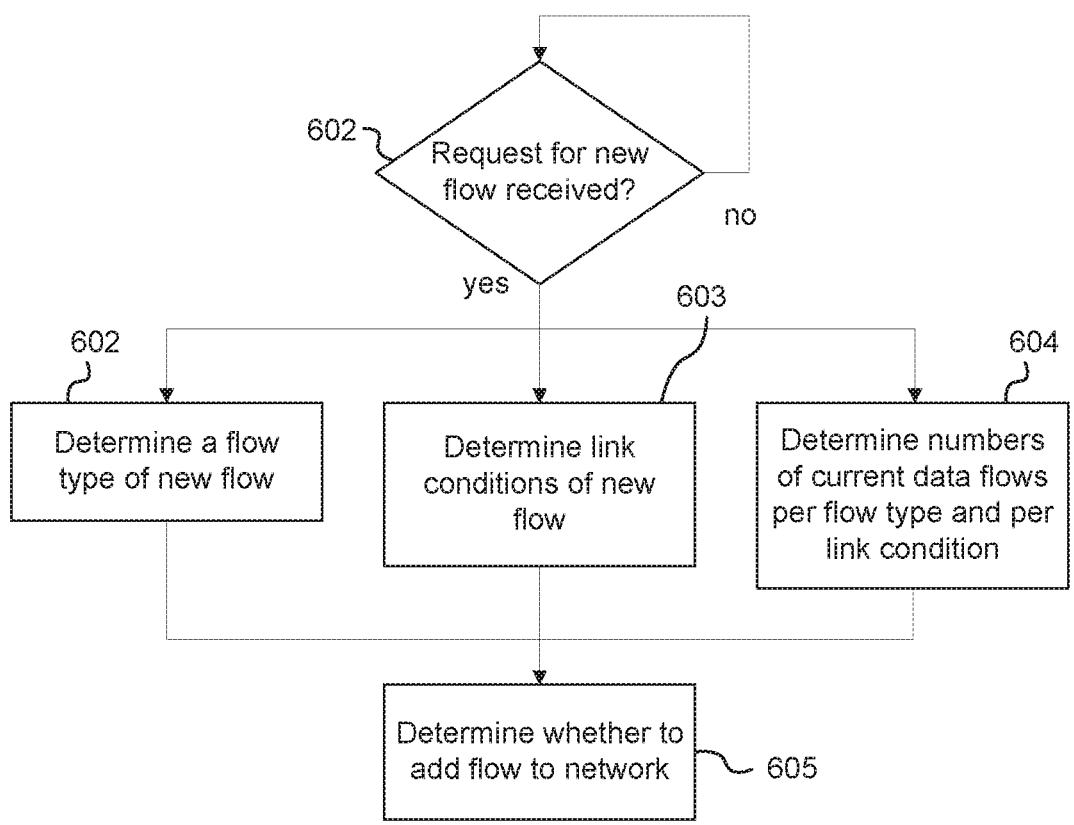
FIG. 6 is a flow chart illustrating an example process of controlling flow admissions based on the experiential capacity of a network.

FIG. 6 illustrates an example process of controlling flow admissions based on the experiential capacity of a network. The process of FIG. 6 may be performed, for example, after a supervised learning phase has been completed. In block 601, it is determined whether a request for a new data flow has been received. If so, then the process continues to blocks 602-604, and if not, then block 601 is repeated until a request is received. In block 602, the flow type of the new data flow is determined. In block 603, the link condition of the new flow is determined. In block 604, the current network state is determined; in other words, the numbers of flows are identified for each combination of flow type and link condition. For example, the determination of the current network state may include determining a traffic matrix that reflects the current network state. In certain examples, the network state may be updated continuously. In block 605, it is determined whether or not to add the requested new flow to the network based on the results of blocks 602-604.

Figure 7:
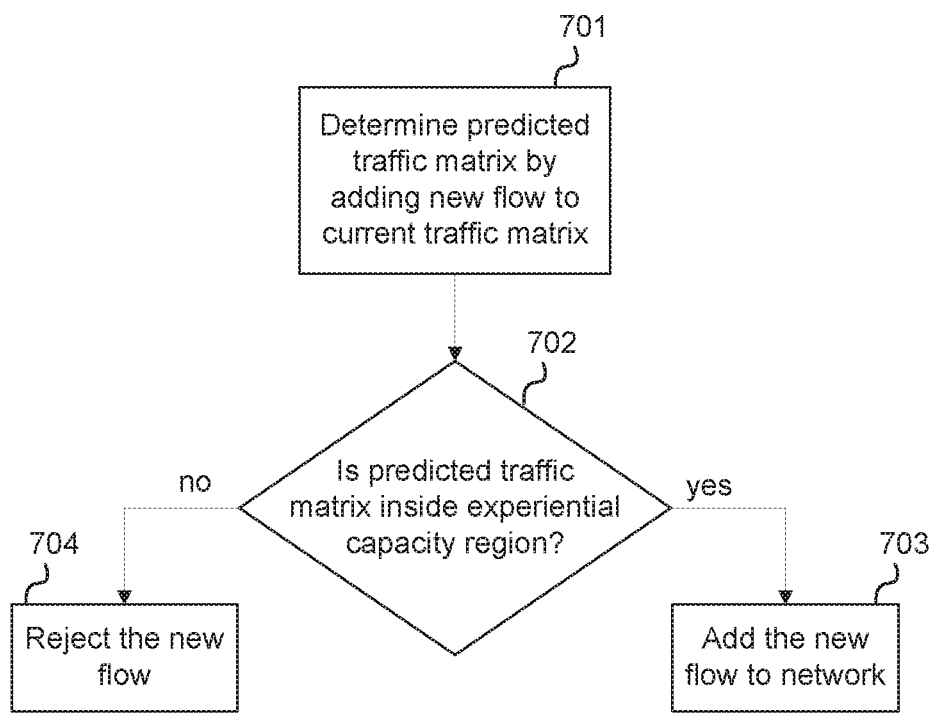
FIG. 7 is a flow chart illustrating an example process of determining whether to add a flow to a network based on the experiential capacity of a network.

FIG. 7 illustrates an example process of determining whether to add a flow to a network based on the experiential capacity of a network. FIG. 7 is one example of how the determination of block 605 may be made. In block 701, a predicted network state/traffic matrix may be determined by adding the requested new flow to a current network state/traffic matrix. In block 702, it is determined whether the predicted network state/traffic matrix is inside the experiential capacity region. For example, the predicted traffic matrix may be presented to a machine-learning engine that has been trained by the process of FIG. 5, and the machine-learning engine may classify the predicted traffic matrix as having acceptable or unacceptable QoE based on its current estimate of the experiential capacity. If the answer to block 702 is yes, then the new flow is added to the network (block 703). If the answer to block 702 is no, then the new flow is rejected (block 704). Rejecting the flow does not necessarily mean that the flow is completely canceled. For example, rejected flows may be handed off to other networks, or the like.

Figure 8:
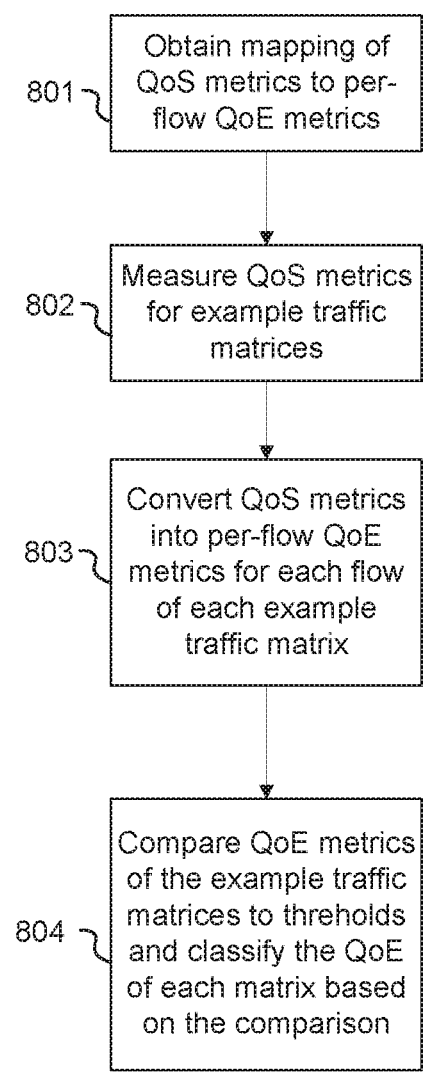
FIG. 8 is a flow chart illustrating an example process of classifying the quality of experience of example traffic matrices.

FIG. 8 illustrates an example process of classifying the QoE of example traffic matrices. The process of FIG. 8 may be used, for example, in block 502 of the process of FIG. 5. In block 801, mappings of QoS metrics to per-flow QoE metrics are obtained. The mappings may be obtained, for example, by accessing mappings that have previously been determined (whether by the network operator or by a third party) or by determining the mappings in the first place. In block 802, the QoS metrics are measured for each example traffic matrix. In block 803, the QoS metrics are used to determine per-flow QoE metrics for each flow of each example traffic matrix. In block 804, the QoE metrics of the example traffic matrices are compared to thresholds, and the traffic matrices are classified as having acceptable QoE or unacceptable QoE based on the results of the comparisons. For example, the QoE metrics may be compared to per-flow threshold, meaning that each flow's QoE metric is compared to a threshold. As another example, the QoE metrics may be aggregated and compared to an aggregate threshold.

Figure 9:
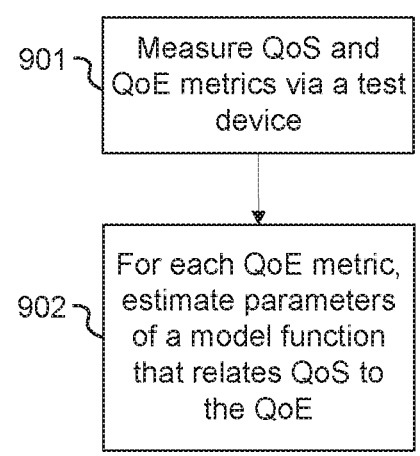
FIG. 9 is a flow chart illustrating an example process of determining mappings between quality of service metrics and quality of experience metrics.

FIG. 9 illustrates an example process of determining mappings between QoS metrics and QoE metrics. The process of FIG. 9 may be used, for example, in block 801 of the process of FIG. 9. In block 901, QoS metrics and QoE metrics are measured on the network using a test device. Multiple measurements may be made in a variety of states. In block 902, for each QoE metric of interest to the network operator, a functional mapping for that QoE metric may be determined. In particular, parameters of a model function that relates QoS metric(s) to the QoE metric of interest may be estimated based on the measurements from block 801, for example via regression analysis.

Various features of example systems, methods, devices, and computer program products may have been described herein in singular form for simplicity of explanation and/or grammatical convenience, but this should not be interpreted to imply that multiple instances of such features cannot be included in the example systems, methods, devices, and computer program products, unless explicitly stated otherwise. In other words, the usage of the singular form in describing a feature should not be interpreted as imparting any limitation related to the number of such features, unless explicitly stated otherwise.

Moreover, certain features may be referred to in pluralized form for simplicity of explanation and/or grammatical convenience, but this should not be interpreted to imply that there cannot be a single instance of the feature, unless explicitly stated otherwise. In other words, the usage of the pluralized form in describing a feature should not be interpreted as imparting any limitation related to the number of such features, unless explicitly stated otherwise.

At various places herein a "network operator" is referred to. It should be understood that such references could refer to both or either of a human operator (such as a network administrator) and a device that participates in operating a network (such as the access point 210, gateway 400, device 450, etc.).

While the above disclosure has been shown and described with reference to the foregoing examples, it should be understood that other forms, details, and implementations may be made without departing from the spirit and scope of this disclosure.

What is claimed is:

1. A method of training a machine learning engine used in determining whether a flow is to be added to a network, comprising:

repeatedly obtaining example traffic matrices representative of example network states by observing actual traffic on the network, wherein each of the example network states is specified in terms of numbers of flows per flow type and link condition for multiple flow types and multiple link conditions;

repeatedly classifying the example traffic matrices as having one or the other quality of experience (QoE) out of two different QoEs based on at least one per-flow QoE metric indicative of an overall per-flow QoE of a type of data flow;

repeatedly feeding the example traffic matrices and their classifications into a machine learning engine;

repeatedly estimating an experiential capacity of the network, the experiential capacity being indicative of those network states having an acceptable QoE;

periodically checking accuracy of the estimated experiential capacity of the network until a set accuracy level is achieved; and ending the training of the machine learning engine upon achieving the set accuracy level.

2. The method of claim 1, wherein the at least one per-flow QoE metric comprises one of a number or frequency of stalls, a number or frequency of frame drops, a page load time, a startup delay, a frame rate, resolution, and peak-signal-to-noise ratio.

3. The method of claim 1, wherein estimating the experiential capacity for the network further comprises:

classifying each of the example network states as having an acceptable QoE based on at least one aggregate QoE threshold.

4. The method of claim 3, wherein classifying the example traffic matrices as having acceptable QoE or unacceptable QoE comprises:

obtaining mappings of quality of service (QoS) metrics to QoE metrics;

measuring per-flow values for the QoS metrics for each of the example network states, determining per-flow values of QoE metrics for the example network states based on the per-flow values of the QoS metrics and the mappings, and classifying the example network states as having acceptable QoE or unacceptable QoE based on the values of the per-flow QoE metrics.

5. The method of claim 1, wherein the network is one of a Wi-Fi network, and a long-term evolution (LTE) network.

6. A device, comprising:

processing circuitry; and a non-transitory computer readable medium storing instructions that are executable by the processing circuitry to establish:

an experiential capacity determining engine determining an experiential capacity of a wireless network by:

identifying network states that occurred during actual usage of the wireless network ("experienced network states");

assigning quality of experience ("QoE") assessments to the experienced network states, the QoE assessments being unmeasured, estimated assessments;

training a classification engine by feeding the experienced network states and their QoE assessments as training data to the classification engine, the trained classification engine determining the experiential capacity;

representing a portion of the experienced network states based on the QoE assessments in a graphical space, wherein the experiential capacity is indicative of those network states, out of possible network states of the wireless network having acceptable QoE, each of the possible network states specifying numbers of data flows per flow type and link conditions for multiple flow types and multiple link conditions; and a flow admission engine determining whether to add or reject a new flow on the wireless network based on a determination that a current network state resides within a boundary of the graphical space representing the experiential capacity of the network.

7. The device of claim 6, further comprising:

communication circuitry to communicably connect the device to an access point of the wireless network, wherein information relating to the actual usage of the wireless network is received by the experiential capacity determining engine from the access point via the communication circuitry.

8. The device of claim 6, further comprising:

wireless communication circuitry to establish the wireless network, wherein the device is an access point of the wireless network.

9. The device of claim 6, wherein the experiential capacity determining engine assigns the QoE assessments to the experienced network states by classifying the experienced network states as having an acceptable QoE or an unacceptable QoE based on whether a per-flow QoE metric of each flow of the respective experienced network state satisfied a per-flow QoE thresholds.

10. The device of claim 6, wherein the experiential capacity determining engine assigns the QoE assessments to the experienced network states by classifying the experienced network states of the network as having an acceptable QoE or an unacceptable QoE based on whether an aggregate QoE metric of the respective experienced network state satisfies an aggregate QoE threshold.

11. The device of claim 6, wherein the specified numbers of data flows is represented as a traffic matrix.

12. The device of claim 11, wherein each dimension of the traffic matrix corresponds to a matrix element representative of flow type and link condition associated with a data flow.

13. The device of claim 11, wherein the flow type corresponds to a type or class of application by or for which a data flow is generated.

* * * * *